(12) United States Patent
Pearl, Jr. et al.

(10) Patent No.: US 11,339,621 B2
(45) Date of Patent: May 24, 2022

(54) SYSTEMS AND METHODS FOR BONDING A DOWNHOLE TOOL TO A SURFACE WITHIN THE BOREHOLE

(71) Applicant: Halliburton Energy Services, Inc., Houston, TX (US)

(72) Inventors: William Cecil Pearl, Jr., Spring, TX (US); Sam Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 16 days.

(21) Appl. No.: 16/878,604

(22) Filed: May 20, 2020

(65) Prior Publication Data
US 2021/0363845 A1 Nov. 25, 2021

(51) Int. Cl.
*E21B 23/06* (2006.01)
*E21B 33/12* (2006.01)
*B23K 3/06* (2006.01)
*B23K 1/00* (2006.01)

(52) U.S. Cl.
CPC .......... *E21B 23/06* (2013.01); *E21B 33/1216* (2013.01); *B23K 1/0008* (2013.01); *B23K 3/0638* (2013.01)

(58) Field of Classification Search
CPC ......... B23K 3/06; B23K 1/0008; E21B 23/00; E21B 33/1216; E21B 33/1208; E21B 34/063; E21B 34/103
See application file for complete search history.

(56) References Cited

U.S. PATENT DOCUMENTS

| | | | |
|---|---|---|---|
| 2,083,976 A * | 6/1937 | Armstrong | F42B 3/06 102/329 |
| 4,658,896 A * | 4/1987 | Milam | E21B 17/1078 166/241.6 |
| 6,955,216 B1 * | 10/2005 | Heijnen | E21B 27/02 166/100 |
| 10,233,717 B2 | 3/2019 | Hered | |

(Continued)

FOREIGN PATENT DOCUMENTS

WO 2017011029 A1 1/2017

OTHER PUBLICATIONS

Cinar et al., Mechanical Fracturing of Core-Shell Undercooled Metal Particles for Heat-Free Soldering, Scientific Reports 6, Article No. 21864 (2016) doi:10.1038/srep21864.

(Continued)

*Primary Examiner* — Giovanna Wright
*Assistant Examiner* — Ronald R Runyan
(74) *Attorney, Agent, or Firm* — K&L Gates LLP (57) ABSTRACT

An assembly for use in a downhole tool. The assembly may include a body that includes a chamber with a solder suspension contained therein, the solder suspension comprising solder particles, each solder particle comprising an outer shell and a liquid metal core that is exposed and solidifies upon rupture of the outer shell. The assembly may also include a port that allows fluid flow between the chamber and an area outside of the chamber. The assembly may further include a plunger actuatable to apply a force to create a pressure to the solder suspension within the chamber to eject the solder suspension from the port at a velocity to rupture the outer shells of the particles upon contact with a surface.

20 Claims, 4 Drawing Sheets

(56) References Cited

U.S. PATENT DOCUMENTS

| | | | |
|---|---|---|---|
| 2006/0086503 A1* | 4/2006 | Reddy | C04B 28/02 |
| | | | 166/293 |
| 2006/0144591 A1 | 7/2006 | Gonzalez et al. | |
| 2006/0185856 A1* | 8/2006 | Steele | E21B 43/103 |
| | | | 166/380 |
| 2007/0284037 A1 | 12/2007 | Buytaert | |
| 2011/0094742 A1 | 4/2011 | Badalamenti | |
| 2012/0211283 A1 | 8/2012 | Digiovanni | |
| 2012/0255742 A1 | 10/2012 | Cortez | |
| 2013/0133876 A1 | 5/2013 | Naedler | |
| 2013/0206425 A1 | 8/2013 | Mazyar et al. | |
| 2015/0021047 A1 | 1/2015 | Buytaert et al. | |
| 2015/0198009 A1* | 7/2015 | Bexte | E21B 29/002 |
| | | | 166/290 |
| 2015/0315868 A1 | 11/2015 | Fripp | |
| 2017/0014958 A1* | 1/2017 | Thou | B23K 35/3013 |
| 2017/0183937 A1 | 6/2017 | Harper | |
| 2017/0370186 A1 | 12/2017 | Stair | |
| 2018/0252091 A1 | 9/2018 | Bustos | |
| 2019/0003282 A1 | 1/2019 | Doherty | |
| 2019/0277109 A1 | 9/2019 | Bowersock | |
| 2020/0362675 A1* | 11/2020 | Anderson | E21B 43/116 |

OTHER PUBLICATIONS

International Search Report and the Written Opinion of the International Search Authority dated Feb. 3, 2021 for PCT Application No. PCT/US2020/035100 filed May 29, 2020.

International Search Report and the Written Opinion of the International Search Authority dated Feb. 18, 2021 for PCT Application No. PCT/US2020/035106 filed May 29, 2020.

International Search Report and the Written Opinion of the International Search Authority dated Jan. 22, 2021 for PCT Application No. PCT/US2020/031277 filed May 29, 2020.

* cited by examiner

SYSTEMS AND METHODS FOR BONDING A DOWNHOLE TOOL TO A SURFACE WITHIN THE BOREHOLE

BACKGROUND

This section is intended to provide relevant background information to facilitate a better understanding of the various aspects of the described embodiments. Accordingly, it should be understood that these statements are to be read in this light and not as admissions of prior art.

Boreholes are drilled into the earth for a variety of purposes including accessing hydrocarbon bearing formations. A variety of downhole tools may be used within a borehole in connection with accessing and extracting such hydrocarbons. Throughout the process, it is necessary to retain one or more components of the various downhole tools in a fixed position or maintain contact between two downhole tools once the downhole tools have been positioned within the borehole. For example, when cementing a casing within the borehole, downhole sleeve valves are often used to control the flow of cement into an annulus formed between the casing and the borehole wall. Once the sleeve valves are positioned within the borehole, they are shifted into an operating position and must maintain the operating position throughout the cementing operation.

Additional downhole tools are commonly employed through the borehole on a tool string such as a wireline, work string, or production tubing for performing completion and/or treatment operations. Such downhole tools must be set within the borehole upon reaching a target location within the borehole. Further, plugs and similar devices may be pumped downhole and contact a seat of a downhole tool to prevent flow through the downhole tool during completion and/or treatment operations. Such plugs must be maintained against the seat to prevent damage to the formation downhole of the plug while the completion and/or treatment operations are conducted uphole of the plug and themselves may be considered a form of downhole tool.

BRIEF DESCRIPTION OF THE DRAWINGS

Embodiments of the downhole tool are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a downhole tool for use in a borehole. The downhole tool includes a system for ejecting a solder suspension from a cavity of the downhole tool onto a surface. The force of the ejection causes an outer shell of the solder particles within the suspension to rupture upon contact with the surface, releasing an inner liquid metal core that, when solidifies, bonds the downhole tool to the surface.

A borehole may in some instances be formed in a substantially vertical orientation relative to the earth's surface, and a lateral borehole may in some instances be formed in a substantially horizontal orientation relative to the earth's surface. However, the orientation of each of these boreholes may include portions that are vertical, non-vertical, horizontal, or non-horizontal. Further, the term "uphole" refers a direction that is towards the earth's surface, while the term "downhole" refers a direction that is further into the earth's surface.

Figure 1:
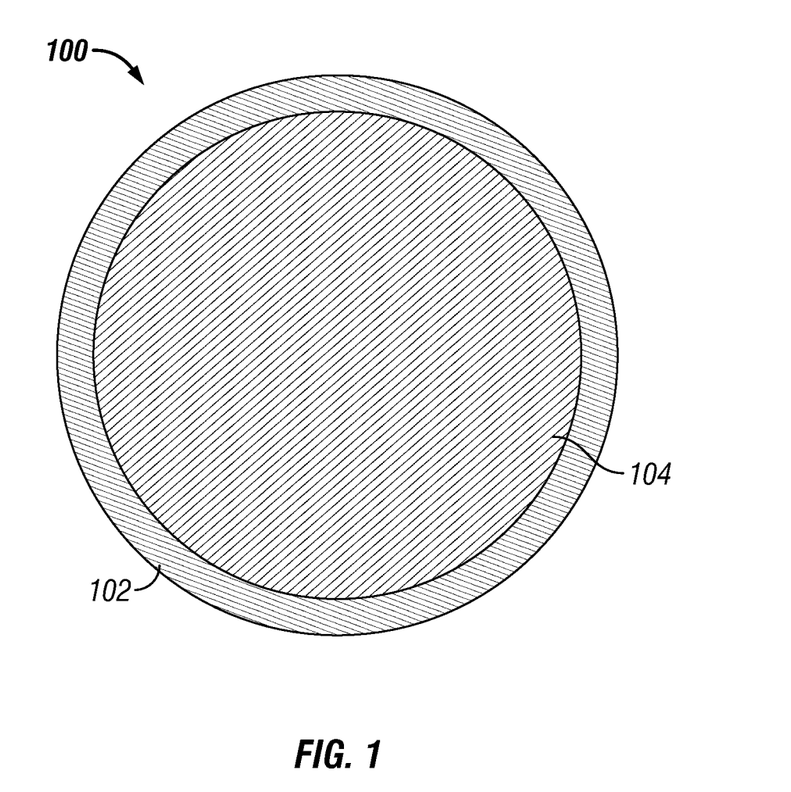
FIG. 1 is a cross-sectional view of a solder particle, according to one or more embodiments.

FIG. 1 is a cross-sectional view of a solder particle 100, according to one or more embodiments. To form the solder particle, a eutectic metal alloy is melted to form a liquid. The liquid eutectic metal is then combined with an acid-containing carrier fluid and a rotating implement is used to shear the liquid metal to form nanoparticles and/or microparticles of the liquid eutectic metal.

After the nanoparticles and microparticles have formed, a chemical reaction occurs that results in the oxidation of an outer layer of the liquid eutectic metal. The oxidation of the outer layer forms a solid outer shell 102 that surrounds a liquid metal core 104. Once the solder particle is formed, the core 104 remains a liquid at ambient conditions until the outer shell 102 is ruptured via mechanical stress, such as an impact or increase in pressure, or chemical etching of the outer shell 102 by an acid. The solder particle 100 can be suspended in a medium, such as, but not limited to, water-based liquids, oil-based liquids, or ethanol-based liquids, to form a solder suspension that can be applied to a surface as a coating.

When the outer shell is ruptured, the liquid metal in the core 104 is released and the liquid metal is exposed to the ambient environmental conditions, the oxide fragments that made up the shell, and/or any surfaces the solder particle was in contact with. This exposure to the various elements causes the liquid metal to solidify and the solidified cores bond adjacent surfaces in contact with the solder particles 100.

Figure 2:
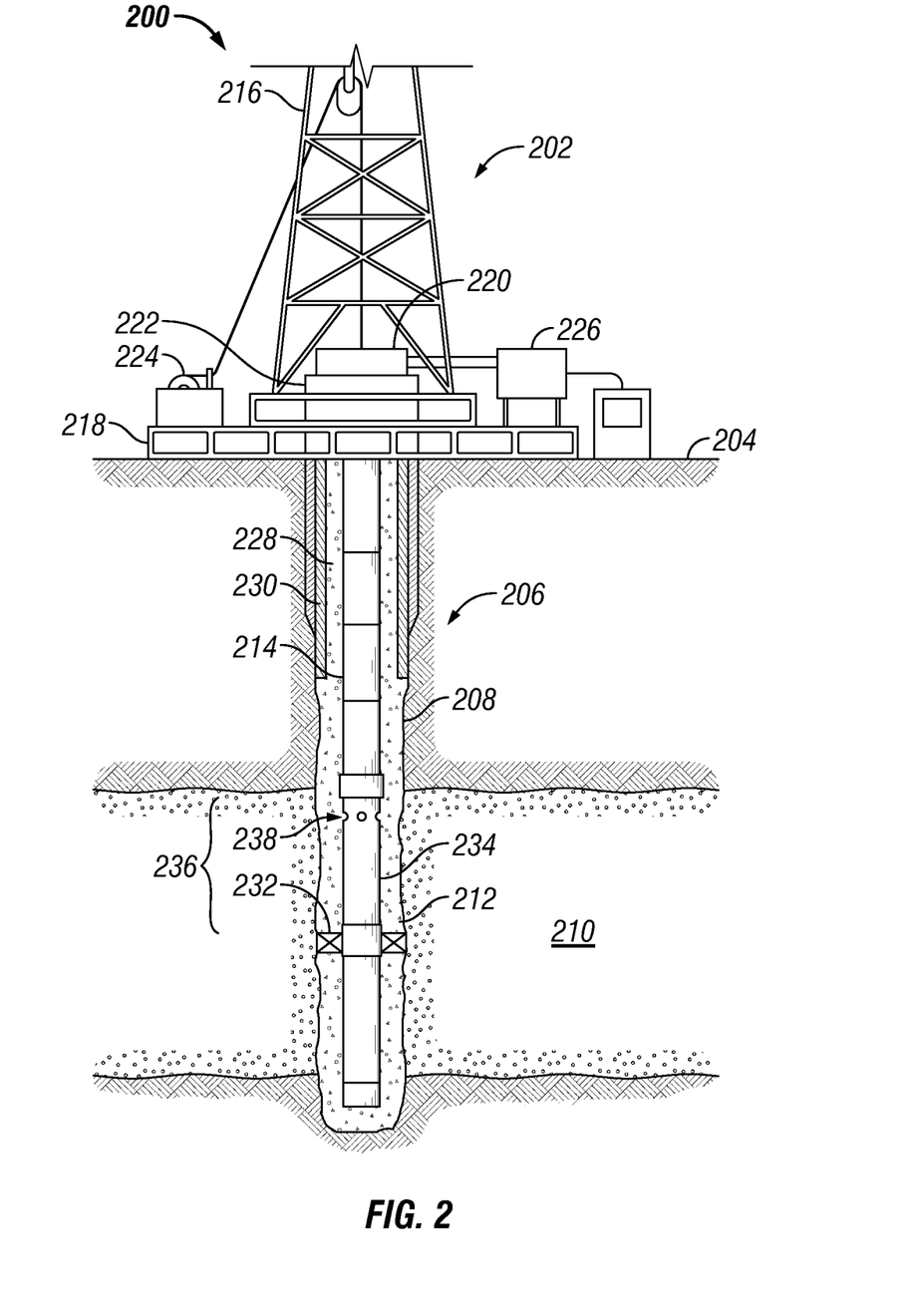
FIG. 2 is a cross-sectional diagram of a well system, according to one or more embodiments.

Turning now to FIG. 2, FIG. 2 is a diagram of a well system 200, according to one or more embodiments. The well system 200 includes a rig 202 atop a surface 204 of a well 206. Beneath the rig 202, a borehole 208 is formed within a geological formation 210, which is expected to produce hydrocarbons in the form of production fluid 212. The borehole 208 may be formed in the geological formation 210 using a drill string that includes a drill bit to remove material from the geological formation 210. The borehole 208 of FIG. 1 is shown as being near-vertical, but may be formed at any suitable angle to reach a hydrocarbon-rich portion of the geological formation 210. In some embodiments, the borehole 208 may follow a vertical, partially-vertical, angled, or even a partially-horizontal path through the geological formation 210.

A production tool string 214 is deployed from the rig 202, which may be a drilling rig, a completion rig, a workover rig, or another type of rig. The rig 202 includes a derrick 216 and a rig floor 218. The production tool string 214 extends downward through the rig floor 218, through a fluid diverter 220 and blowout preventer 222 that provide a fluidly sealed interface between the borehole 208 and external environment, and into the borehole 208 and geological formation 210. The rig 202 may also include a motorized winch 224 and other equipment for extending the production tool string 214 and other tools into the borehole 208, retrieving the production tool string 214 or other tools, from the borehole 208, and positioning the production tool string 214 or other tools at a selected depth within the borehole 208. Coupled to the fluid diverter 220 is a pump 226. The pump 226 is operational to deliver or receive fluid through an internal bore of the production tool string 214 by applying a positive or negative pressure to the internal bore. The pump 226 may also deliver or receive fluid through an annulus 228 formed between the wall of the borehole 208 and an exterior of the production tool string 214 by applying a positive or negative pressure to the annulus 228. The annulus 228 is formed between the production tool string 214 and a casing 230 when production tool string 214 is disposed within the borehole 208.

Following formation of the borehole 208, the production tool string 214 may be equipped with tools and deployed within the borehole 208 to prepare, operate, or maintain the well 206. Specifically, the production tool string 214 may incorporate tools that are actuated after deployment in the borehole 208, including without limitation bridge plugs, composite plugs, cement retainers, high expansion gauge hangers, straddles, and packers. Actuation of such tools may result in centering the production tool string 214 within the borehole 208, anchoring the production tool string 214, isolating a segment of the borehole 208, or other functions related to positioning and operating the production tool string 214. In the illustrative embodiment shown in FIG. 2, the production tool string 214 is depicted with packers 232 within a production zone of the geological formation 210. The packers 232 are configured to provide fluid seals between the production tool string 214 and the borehole 208, thereby defining intervals within the production zone. Packers 232 are typically used to prepare the borehole 208 for hydrocarbon production during operations such as fracturing of the formation or for service during formation of the well during operations such as acidizing or cement squeezing.

Between the packers 232 is a downhole tool 234, such as valve, that controls the flow of production fluid 212 into the production string 214 at each interval 236. Although FIG. 2 depicts the downhole tool 234 as being separated by packers 232, this illustration is not intended as limiting, and other arrangements of downhole tools 234 in the production tool string 214 are possible. For example, a downhole tool 234 may be integrated into the production tool string 214 adjacent hydraulic fracturing sleeves. Furthermore, while FIG. 2 presents the production tool string 214 as having one downhole tools 234, such presentation is for purposes of illustration only. The present disclosure is not limited to any particular number of downhole tools 234 or arrangement of downhole tools 234 relative to packers 232 or interval 236.

When operated, the downhole tool 234 exposes or covers one or more flow ports 238 of the downhole tool 234. When exposed, flow ports 238 allow fluid to into the production string 214 to facilitate the collection and extraction of the production fluid 212. It is noted that while the operating environment shown in FIG. 2 relates to a stationary, land-based rig for raising, lowering, and setting the production tool string 214, in alternative embodiments, mobile rigs, wellbore servicing units (e.g., coiled tubing units, slickline units, or wireline units), and the like may be used to lower the production tool string 214. Furthermore, while the operating environment is generally discussed as relating to a land-based well, the systems and methods described herein may instead be operated in subsea well configurations accessed by a fixed or floating platform.

Figure 3:
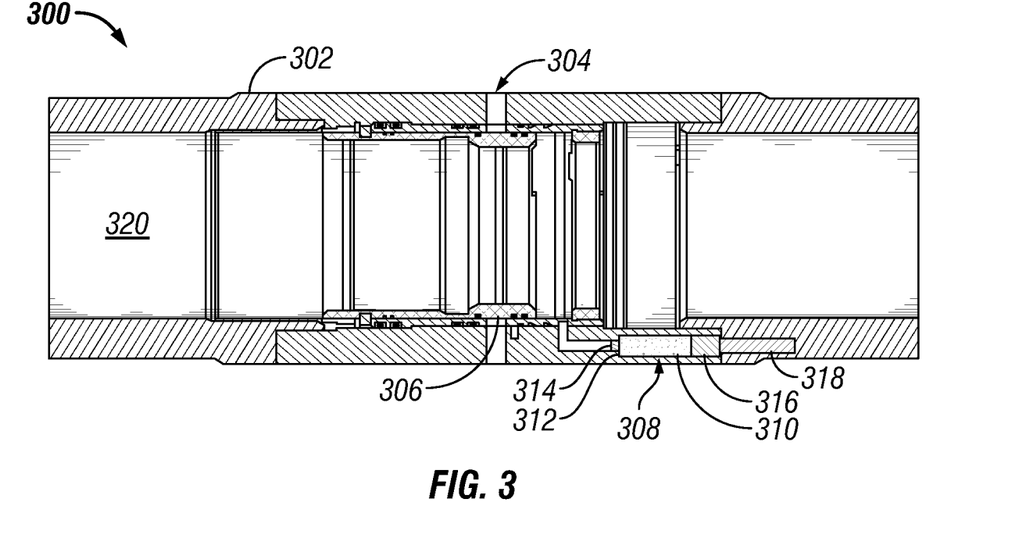
FIG. 3 is a partial cross-sectional diagram of a downhole tool in a run-in position, according to one or more embodiments.
Figure 4:
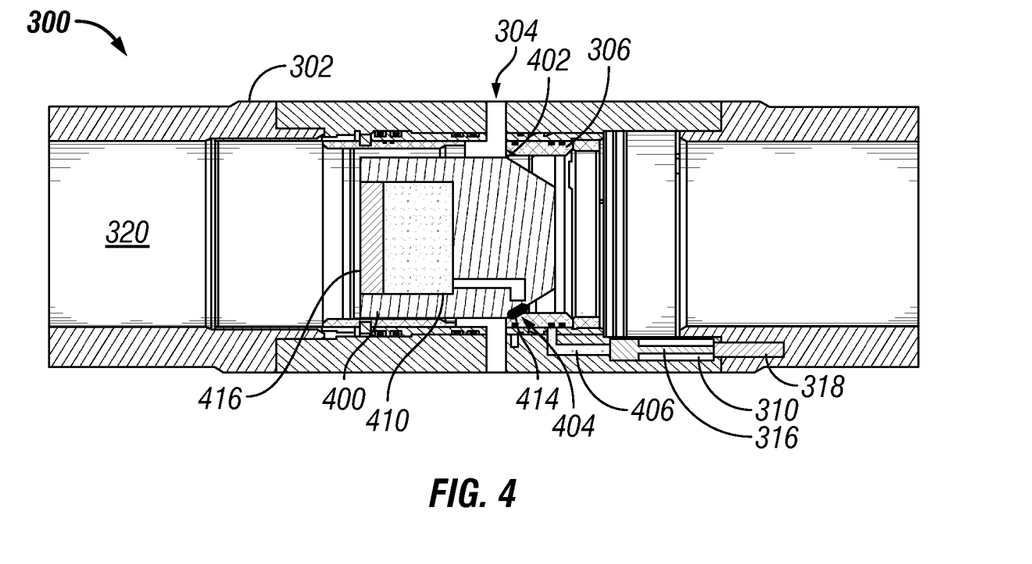
FIG. 4 is a partial cross-sectional diagram of a downhole tool in a closed position.

Turning now to FIGS. 3 and 4, FIGS. 3 and 4 are cross-sectional diagrams of a downhole tool 300, according to one or more embodiments. The downhole tool 300 may be used in place of downhole tool 234 depicted in FIG. 2 to control the flow of a fluid. The downhole tool 300 is positionable between a run-in position in which the valve is closed and an open position, as described in more detail below. The downhole tool 300 includes a tubular body 302 that includes one or more ports 304 and an inner sleeve 306 slidable within the tubular body 302. The inner sleeve 306 is initially held in the run-in position via a shear pin or similar means known to those skilled in the art to block the ports 304 and prevent fluid from passing from the bore 320 of the downhole tool, through the ports 304, and into an annulus surrounding the downhole tool 300.

The downhole tool also includes an assembly 308 that ejects the solder suspension discussed above from a chamber 310 and through a port 312 in the chamber at a velocity to rupture the outer shells of the particles upon contact with a surface of the downhole tool 300. The solder suspension is prevented from flowing to an area outside of the chamber 310 by a openable barrier 314 that blocks the port 312. The barrier 314 may be a rupture disc configured to burst at a pressure below the pressure necessary to rupture the shells of the solder particles, a degradable barrier that dissolves in the presence of a specific chemical, or an actuatable barrier, such as a valve, that actuates via an electronic or hydraulic signal. The assembly 308 also includes a plunger 316 that is actuated via an actuator 318 to apply a force to pressurize and eject the solder suspension from the chamber. The actuator 318 may be an electromechanical actuator. In other embodiments, the plunger 316 may be actuated by applying hydraulic pressure from a control line, fluid within the bore 320 of the downhole tool, or fluid within the borehole to the portion of the plunger 316 opposite the solder suspension.

When the downhole tool 300 is to be opened, a plug 400 is pumped downhole and impacts a seat 402 coupled to or formed in an uphole portion 404 of the inner sleeve 306. The pressure applied to the plug 400 is great enough that the locking mechanism holding the inner sleeve 306 in the run-in position is overcome and the inner sleeve 306 slides into the open position, as shown in FIG. 4. The movement to the open position opens the ports 304 in the tubular body 302 and allows fluid to flow out from the bore 320 of the downhole tool 300. In some embodiments, the barrier 314 is also actuated to an open position or sufficient time is given to allow a degradable barrier 314 to dissolve.

Once the ports 304 have been opened by the inner sleeve 306, a signal from a control system (not shown) or a sensor (not shown) that directly or indirectly detects the presence of the plug 400 activates the electromechanical actuator 318, causing the plunger 316 to eject the solder suspension from the chamber 310. The solder suspension is ejected through a fluid line 406 in communication with the port 312 at a velocity that is sufficient to rupture the shells of the solder particles within the suspension once they contact a surface of the inner sleeve 306 or the body 302. In some embodiments, ejecting the solder suspension also ruptures the barrier 314. Once the shells of the solder particles rupture, the liquid metal cores are exposed and solidify to bond the inner sleeve 306 to the body 302.

In at least one embodiment, the plug 400 includes a chamber 410 that contains the solder suspension discussed above, a plunger 416 to eject the solder suspension, and a releaseable/openable barrier 414, as discussed above with respect to barrier 314, to prevent the solder suspension from being ejected prior to the plug 400 contacting the seat 402.

In other embodiments, the barrier 414 may be a degradable barrier that dissolves in the presence of a specific chemical. Once the plug 400 contacts the seat 402, hydraulic pressure within the bore 320 increases, causing the plunger 416 to shift towards the seat, creating a sufficient pressure to burst the barrier 414 and eject the solder suspension from the chamber 410 at velocity sufficient to rupture the shells of the solder particles upon contact with the inner sleeve 306 or body 302. Rupturing the outer shells releases the inner liquid metal core and the exposed liquid metal cores then solidifies, bonding the plug 400 to the downhole tool 300. The bond between the plug 400 and the downhole tool 300 prevents the plug 400 from being unseated and allows the plug 400 to be milled more efficiently.

Figure 5:
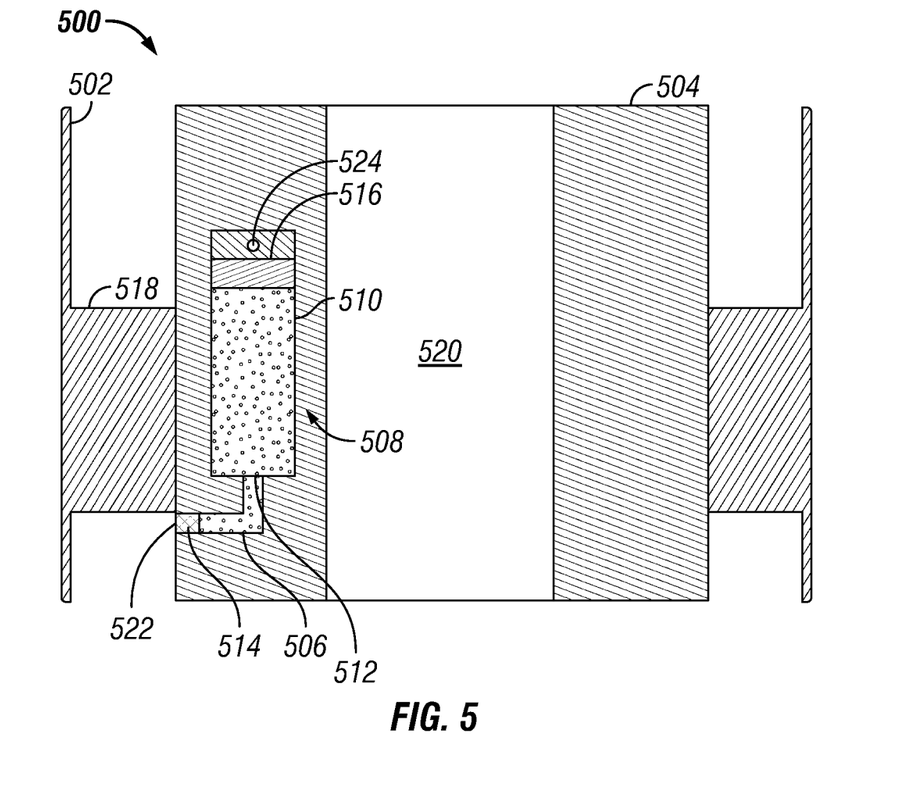
FIG. 5 is a partial cross-sectional diagram of a downhole tool, according to one or more embodiments.

Turning now to FIG. 5, FIG. 5 is a partial cross-sectional diagram of a downhole tool 500 in a borehole with a borehole wall 502, according to one or more embodiments. The downhole tool 500 may be used in place of the packer 232 depicted in FIG. 2 to isolate zones within a borehole. The downhole tool includes a body 504 and a sealing element 518. The sealing element 518 may be an inflatable sealing element, a swellable sealing element, or any other type of sealing element suitable to isolate a zone within a borehole. The downhole tool also includes an assembly 508 that ejects the solder suspension discussed above from a chamber 510 and through a port 512 in the chamber at a velocity sufficient to rupture the outer shells of the particles upon contact with a surface of the borehole wall 502 or an inner surface of a casing disposed within the borehole.

The solder suspension is held within the chamber 510 by an openable barrier 514 that blocks the outlet 522 of the fluid line 506. The barrier 514 may be a rupture disc configured to burst at a pressure below the pressure necessary to rupture the shells of the solder particles, a degradable barrier that dissolves in the presence of a specific chemical, or an actuatable barrier, such as a valve, that actuates via an electronic or hydraulic signal. The assembly 508 also includes a plunger 516 that is actuated via hydraulic pressure supplied through a hydraulic port 524 from a control line, fluid within the bore 520 of the downhole tool, or fluid within the borehole to the portion of the plunger 516 opposite the solder suspension to pressurize and eject the solder suspension. In other embodiments, the plunger 516 may be actuated by via an electromechanical actuator (not shown).

Once it is desired to actuate the plunger 516 to eject the solder suspension, the barrier 514 is opened via control signal. In other embodiments, ejecting the solder suspension bursts the barrier 514 or sufficient time is allowed for the barrier 514 to dissolve. Once ejected, the solder particles contact the borehole wall 502 with enough velocity to rupture the outer shells, releasing the inner liquid metal cores and allowing the liquid metal to solidify against both the borehole wall 502 and the sealing element 518. This creates a bond between the borehole wall 502, the solidified metal, and the sealing element 518 or another surface of the downhole tool 500. In some embodiments, the solidified cores of the solder particles contact and solidify on the borehole wall 502 to act as an anti-extrusion device to prevent extrusion of the sealing element 518. In other embodiments, the solidified cores of the solder particles act as a second seal between the downhole tool 500 and the borehole wall 502.

Further examples include:

Example 1 is an assembly for use in a downhole tool. The assembly includes a body that includes a chamber with a solder suspension contained therein, the solder suspension comprising solder particles, each solder particle comprising an outer shell and a liquid metal core that is exposed and solidifies upon rupture of the outer shell. The assembly also includes a port that allows fluid flow between the chamber and an area outside of the chamber. The assembly further includes a plunger actuatable to apply a force to create a pressure to the solder suspension within the chamber to eject the solder suspension from the port at a velocity to rupture the outer shells of the particles upon contact with a surface.

In Example 2, the embodiments of any preceding paragraph or combination thereof further include an openable barrier positioned within the port to prevent the solder suspension from flowing to the area outside of the chamber.

In Example 3, the embodiments of any preceding paragraph or combination thereof further include wherein the barrier is a rupture disc.

In Example 4, the embodiments of any preceding paragraph or combination thereof further include wherein the barrier is degradable.

In Example 5, the embodiments of any preceding paragraph or combination thereof further include wherein the barrier is a valve.

In Example 6, the embodiments of any preceding paragraph or combination thereof further include wherein the plunger is actuated via hydraulic pressure applied to a portion of the plunger opposite the solder suspension.

In Example 7, the embodiments of any preceding paragraph or combination thereof further include wherein the plunger is actuated via an electromechanical actuator.

In Example 8, the embodiments of any preceding paragraph or combination thereof further include downhole tool for use in a borehole. The downhole tool includes a body includes a chamber with a solder suspension contained therein, the solder suspension comprising solder particles, each solder particle comprising an outer shell and a liquid metal core that is exposed and solidifies upon rupture of the outer shell. The downhole tool also includes a port that allows fluid flow between the chamber and an area outside of the chamber. The downhole tool further includes a plunger actuatable to apply a force to create a pressure to the solder suspension within the chamber to eject the solder suspension from the port at a velocity to rupture the outer shells of the particles upon contact with a surface. The downhole tool also includes an openable barrier positioned to prevent the solder suspension from flowing to the area outside of the chamber.

In Example 9, the embodiments of any preceding paragraph or combination thereof further include wherein the barrier is positioned within at least one of the port or a fluid line of the downhole tool in communication with the port.

In Example 10, the embodiments of any preceding paragraph or combination thereof further include wherein the barrier includes at least one of a rupture disc, a degradable barrier, or a valve.

In Example 11, the embodiments of any preceding paragraph or combination thereof further include wherein the plunger is actuated via hydraulic pressure applied to a portion of the plunger opposite the solder suspension.

In Example 12, the embodiments of any preceding paragraph or combination thereof further include further comprising an electromechanical actuator operable to actuate the plunger.

In Example 13, the embodiments of any preceding paragraph or combination thereof further include wherein the downhole tool includes at least one of a valve or a plug.

Example 14 is a method for bonding a portion of a downhole tool for use within a borehole. The method includes disposing the downhole tool within the borehole, the downhole tool including a chamber including a solder suspension comprising solder particles, each solder particle comprising an outer shell and a liquid metal core that is exposed and solidifies upon rupture of the outer shell. The method also includes opening a barrier of the downhole tool to allow the solder suspension to be ejected to an area outside of the chamber. The method further includes actuating a plunger of the downhole tool to eject the solder suspension from a port of the chamber at a velocity to rupture the outer shells and release the liquid metal cores upon contact with the surface. The method also includes allowing the released liquid metal cores to solidify to bond the downhole tool to the surface.

In Example 15, the embodiments of any preceding paragraph or combination thereof further include wherein the downhole tool is a valve and the surface is a portion of the downhole tool. The method further includes actuating the valve to either an open position or a closed position. Additionally, allowing the solder particles to solidify includes retaining the valve in the open position or the closed position.

In Example 16, the embodiments of any preceding paragraph or combination thereof further include wherein the surface is either a borehole wall or an inner surface of a casing disposed within the borehole.

In Example 17, the embodiments of any preceding paragraph or combination thereof further include creating a seal via the solidified cores of the solder particles.

In Example 18, the embodiments of any preceding paragraph or combination thereof further include pumping a plug downhole. The method also includes actuating a plunger of the plug to eject a solder suspension comprising solder particles, each solder particle comprising an outer shell and a liquid metal core, from a chamber of the plug at a velocity to rupture the outer shells and release the liquid metal cores upon contact with the downhole tool. The method further includes allowing the released liquid metal cores to solidify to bond the plug to the downhole tool.

In Example 19, the embodiments of any preceding paragraph or combination thereof further include wherein allowing the released liquid metal cores to solidify further includes allowing the released liquid metal cores to solidify to create a bond between a wall of the borehole, the solidified metal, and a sealing element of the downhole tool.

In Example 20, the embodiments of any preceding paragraph or combination thereof further include preventing extrusion of the sealing element via the solidified metal cores.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. An assembly for use in a downhole tool, the assembly comprising:
    a body comprising a chamber with a solder suspension contained therein, the solder suspension comprising solder particles, each solder particle comprising an outer shell and a liquid metal core that is exposed and solidifies upon rupture of the outer shell; and
    a port that allows fluid flow between the chamber and an area outside of the chamber; and
    a plunger actuatable within the chamber to apply a force to eject the solder suspension from the port at a velocity to rupture the outer shells of the particles upon contact with a surface.

2. The assembly of claim 1, further comprising an openable barrier positioned within the port to prevent the solder suspension from flowing to the area outside of the chamber.

3. The assembly of claim 2, wherein the barrier is a rupture disc.

4. The assembly of claim 2, wherein the barrier is degradable.

5. The assembly of claim 2, wherein the barrier is a valve.

6. The assembly of claim 1, wherein the plunger is actuated via hydraulic pressure applied to a portion of the plunger opposite the solder suspension.

7. The assembly of claim 1, wherein the plunger is actuated via an electromechanical actuator.

8. A downhole tool for use in a borehole, the downhole tool comprising:
    a body comprising a chamber with a solder suspension contained therein, the solder suspension comprising solder particles, each solder particle comprising an outer shell and a liquid metal core that is exposed and solidifies upon rupture of the outer shell;
    a port that allows fluid flow between the chamber and an area outside of the chamber;
    a plunger actuatable within the chamber to apply a force to eject the solder suspension from the port at a velocity to rupture the outer shells of the particles upon contact with a surface; and
    an openable barrier positioned to prevent the solder suspension from flowing to the area outside of the chamber.

9. The downhole tool of claim 8, wherein the barrier is positioned within at least one of the port or a fluid line of the downhole tool in communication with the port.

10. The downhole tool of claim 8, wherein the barrier comprises at least one of a rupture disc, a degradable barrier, or a valve.

11. The downhole tool of claim 8, wherein the plunger is actuated via hydraulic pressure applied to a portion of the plunger opposite the solder suspension.

12. The downhole tool of claim 8, further comprising an electromechanical actuator operable to actuate the plunger.

13. The downhole tool of claim 8, wherein the downhole tool comprises at least one of a valve or a plug.

14. A method for bonding a portion of a downhole tool for use within a borehole, the method comprising:

disposing the downhole tool within the borehole, the downhole tool comprising a chamber containing a solder suspension comprising solder particles, each solder particle comprising an outer shell and a liquid metal core that is exposed and solidifies upon rupture of the outer shell;

opening a barrier of the downhole tool;

actuating a plunger of the downhole tool within the chamber to eject the solder suspension through the open barrier and from a port of the chamber at a velocity to rupture the outer shells and release the liquid metal cores upon contact with a surface; and allowing the released liquid metal cores to solidify to bond the portion of the downhole tool to the surface.

15. The method of claim 14, wherein:

the downhole tool is a valve;

the surface is a portion of the downhole tool;

the method further comprises actuating the valve to either an open position or a closed position; and allowing the solder particles to solidify comprises retaining the valve in the open position or the closed position.

16. The method of claim 14, wherein the surface is either a borehole wall or an inner surface of a casing disposed within the borehole.

17. The method of claim 14, further comprising creating a seal via the solidified cores of the solder particles.

18. The method of claim 14, further comprising:

pumping a plug downhole;

actuating a plunger within a chamber of the plug to eject a solder suspension comprising solder particles, each solder particle comprising an outer shell and a liquid metal core, from the chamber of the plug at a velocity to rupture the outer shells and release the liquid metal cores upon contact with the downhole tool; and allowing the released liquid metal cores to solidify to bond the plug to the downhole tool.

19. The method of claim 14, wherein allowing the released liquid metal cores to solidify further comprises allowing the released liquid metal cores to solidify to create a bond between a wall of the borehole, the solidified metal, and a sealing element of the downhole tool.

20. The method of claim 19, further comprising preventing extrusion of the sealing element via the solidified metal cores.

* * * * *